United States Patent [19]

Tucholski

[11] Patent Number: 4,656,104
[45] Date of Patent: Apr. 7, 1987

[54] SEALING GASKET FOR ELECTROCHEMICAL CELLS

[75] Inventor: Gary R. Tucholski, Parma Heights, Ohio

[73] Assignee: Union Carbide Corporation, Danbury, Conn.

[21] Appl. No.: 814,163

[22] Filed: Dec. 23, 1985

Related U.S. Application Data

[63] Continuation of Ser. No. 359,900, Mar. 19, 1982.

[51] Int. Cl.⁴ .............................................. H01M 2/08
[52] U.S. Cl. .................................. 429/185; 429/173; 429/174
[58] Field of Search ................................ 429/171–174, 429/185

[56] References Cited

U.S. PATENT DOCUMENTS

| | | | |
|---|---|---|---|
| 2,642,470 | 6/1953 | Reinhart et al. | 429/171 |
| 2,712,565 | 7/1955 | Williams | 429/172 |
| 3,068,313 | 12/1962 | Daley | 136/133 |
| 3,852,115 | 12/1974 | Lewis et al. | 136/111 |
| 3,884,723 | 5/1975 | Wuttke | 136/111 |
| 3,904,438 | 9/1975 | Naylor et al. | 136/133 |
| 3,990,918 | 11/1976 | Bro et al. | 429/185 |
| 4,129,686 | 12/1978 | Kaduboski | 429/61 |
| 4,220,695 | 9/1980 | Ishida et al. | 429/172 |
| 4,256,815 | 3/1981 | Smilanich et al. | 429/185 |
| 4,309,493 | 1/1982 | Kühl et al. | 429/174 |
| 4,557,983 | 12/1985 | Sauer | 429/185 X |

FOREIGN PATENT DOCUMENTS

| | | | |
|---|---|---|---|
| 64402 | 11/1982 | European Pat. Off. | 429/185 |
| 2381397 | 9/1978 | France | 429/164 |
| 53-119119 | 9/1978 | Japan . | |
| 55-21817 | 2/1980 | Japan . | |
| 0133754 | 10/1980 | Japan | 429/185 |

Primary Examiner—Brian E. Hearn
Assistant Examiner—Stephen J. Kalafut

[57] ABSTRACT

A sealing gasket for an electrochemical cell disposed between the cell container and cover comprising an annular sidewall and an inwardly extending base flange, said sidewall having a nonuniform thickness such that the average thickness of that quarter of said sidewall immediately above said flange is greater than the average thickness of the sidewall at its top quarter, thereby enabling increased sealing surface area and increased terminal clearance.

5 Claims, 5 Drawing Figures

SEALING GASKET FOR ELECTROCHEMICAL CELLS

This application is a continuation of prior U.S. Application Ser. No. 359,900 Mar. 19, 1982.

DESCRIPTION

1. Technical Field

This invention relates to an improved sealing gasket for electrochemical cells, which gasket has a vertical sidewall whose upper portion has reduced thickness which will enable increased surface sealing area and increased cell cover clearance to be obtained for thin miniature cells.

2. Background Art

The miniaturization of electronics has created a demand for very small but powerful electrochemical cells. Cells that utilize an alkaline electrolyte are known to provide high energy density per unit volume, and so, are well suited for applications in miniature electronic devices such as hearing aids, watches and calculators. However, alkaline electrolytes, such as aqueous potassium hydroxide and sodium hydroxide solutions, have an affinity for wetting metal surfaces and are known to creep through the sealed metal interface of an electrochemical cell. Leakage in this manner depletes the electrolyte solution from the cell which shortens cell life and can also cause a corrosive deposit on the surface of the cell that detracts from the cell's appearance and marketability. These corrosive salts may also damage the device in which the cell is housed. Typical cell systems where this problem is encountered include silver oxide-zinc cells, nickel-cadmium cells, air-depolarized cells, and alkaline manganese dioxide cells. In the prior art it has been a conventional practice to incorporate a sealing gasket between the cell container and cover so as to provide a primary barrier to electrolyte leakage. The gasket must also be electrically insulating so as to separate the cell container, which generally is the positive terminal of the cell, from the cell cover, which is the negative terminal of the cell. The gasket must be made of a material that is inert to the electrolyte contained in the cell and the internal cell environment. The gasket material must also be resilient so as to effect a seal after being compressed by radial forces and resistant to cold flow under pressure. Cold flow, as used herein, refers to the gradual deformation that occurs when a material is subjected to a constant load at room temperature. A sealing gasket must maintain its resiliency and resistance to cold flow so as to insure a stable seal during long periods of storage and use. Known materials that have the best combination of electrical resistivity, chemical stability, resiliency and resistance to cold flow are fairly rigid and, when compressed, are unable to conform exactly to the contour of the cell container sidewall and anode cover. Hence, some further refinements are necessary to make the seal leakproof.

Generally, a prior art sealing gasket comprises an upright annular sidewall having parallel wall surfaces and an inwardly extending flange at the base of the sidewall. The gasket flange contacts and supports the horizontally disposed edge flange of the cell cover, while the outward facing surface of the gasket sidewall is in contact with the container sidewall. When the cell is assembled, radially compressive sealing forces are concentrated at that portion of the gasket which is between the edge of the cell cover and the container sidewall. The container sidewall and gasket sidewall which extend above this compression point are crimped, or bent inward, towards the cell cover.

The geometry of these prior art sealing gaskets is not well suited for withstanding radial compression or crimping. If the sealing forces exceed the yield strength of the gasket material at that point between the cover flange and the container sidewall, or if the sealing forces reduce the inner diameter of the cell container to less than the diameter of the cell cover, then the flange of the cell cover may cut through and sever the gasket at that point. This is especially so if the edge flange of the cell cover is perpendicular to the gasket sidewall. This severing of the gasket, commonly known as gasket cutthrough, produces shorted cells and possibly heavy electrolyte leakage.

Also, when the top of the container sidewall is crimped over the gasket sidewall, the gasket material may be extruded from between the container sidewall and the cell cover; or the gasket material may be unyielding and pose a barrier to crimping forces, limiting the degree to which the container sidewall bends. Both of these possibilities can interfere with terminal clearance, especially in very thin cells. Terminal clearance, as used herein, refers to the distance that a cell cover extends above the peripheral sealing edge, or shoulder, of the cell. Generally, a thin electrochemical cell fits snugly into a cavity in an electronic device in which it is to be used, the cell container contacting the positive lead of the device and the cell cover contacting the negative lead of the electronic device. If the sealing gasket protrudes above the cell cover, as by extrusion, it may prevent the cell cover from contacting the negative lead of the device in which it is housed. If the cell cover is eclipsed by the container sidewall, then the sidewall may contact the negative lead of the electronic device, shorting out the circuit.

Many attempts have been made to refine the sealing gasket that is disposed between the cell container and cell cover of an electrochemical cell, particularly a miniature cell. It is well known to fill the crevices at the container-gasket and cover-gasket interfaces with materials such as fatty polyamides, epoxy resins, asphalt or cured epoxy polyamides. U.S. Pat. No. 4,256,815 discloses a bead of a polyamide adhesive disposed on the top edge of the gasket and extending over to contact and at least partially cover the edge of the container and the edge of the cover. However, such approaches address only the problem of electrolyte leakage; there are no features which increase terminal clearance or reduce the possibility of gasket cutthrough.

U.S. Pat. Nos. 3,852,115 and 3,904,438 broadly disclose sealing gaskets having a slotted portion to receive the peripheral edge of the cell cover, thereby lengthening the distance that electrolyte must traverse to creep past the cover/gasket interface at the expense of increasing cell height. Further, U.S. Pat. No. 3,904,438 features an annular projection on the outer surface of the gasket sidewall which aligns with the cover flange to concentrate sealing forces at that point, an undesirable choice which concentrates pressure at the site of gasket cutthrough.

U.S. Pat. Nos. 3,068,313 and 3,990,918 describe sealing gaskets comprising dual materials wherein a first material provides increased sealing ability and a second material provides other characteristics such as resistance to cold flow.

While the above disclosures provide improved barriers to electrolyte leakage and in some instances decrease the probability of gasket cutthrough, none of the aforementioned inventions are well suited for today's very thin electrochemical cells which require thin sealing edges to insure adequate terminal clearance for electrical contact.

It would be a contribution to the field of miniature electrochemical cells to provide a sealing gasket which prevents electrolyte leakage and also reduces the probability of gasket cutthrough and increases terminal clearance.

Hence it is an object of the present invention to provide a gasket for sealing miniature cells whereby sealing surface area is increased, gasket cutthrough is decreased and terminal clearance is increased.

The foregoing and additional objects of this invention will become more fully apparent from the following description.

DISCLOSURE OF INVENTION

This invention relates to a sealing gasket for electrochemical cells which is disposed and compressed between the edge of the cell cover and the sidewall of the cell container, said gasket comprising an upright annular sidewall having an inner surface, an outer surface, a top surface, and an inwardly disposed flange at the base of said sidewall; said sidewall having a nonuniform thickness such that the thickness of the sidewall immediately above the flange is greater than the thickness of the sidewall at its top, thereby enabling increased sealing surface area and increased terminal clearance to be obtained in thin miniature cells. For example, the cell cover may terminate in a horizontal flange, a vertical flange, or any combination thereof. Specifically, the nonuniform thickness of the sidewall is such that the average thickness of the sidewall at its top quarter is from about 25 to about 85 percent of the average thickness of the sidewall at that quarter beginning immediately above the flange.

The sealing gasket of this invention can be formed by providing a sidewall having a substantially upright outer surface and a vertically tapered inner surface, a vertically tapered outer surface and a substantially upright inner surface, a vertically tapered outer surface and a vertically tapered inner surface, or an inner and/or outer stepped surface. Any embodiment of this invention possesses a geometry which allows the gasket much flexibility to bend under cell sealing forces and removes unnecessary gasket material which previously would contribute to the height of the sealing periphery of the cell. Typically, a sealing gasket undergoes compression due to radial sealing forces, as by swaging wherein the radius of the cell container is reduced, whereafter the upper portion of the cell container sidewall is crimped, that is, bent inward. With a prior art sealing gasket, the container sidewall is only slightly crimped before it squeezes the gasket sidewall against the cell cover. Further crimping would cause gasket material to extrude from that space between the container sidewall and cell cover. A gasket of the present invention, which has a nonuniform sidewall, permits the container sidewall to be crimped such that the uppermost bent over portion of the container sidewall is substantially parallel to the container base. This degree of crimping exerts vertical force on both sides of that portion of the cell cover flange which is embraced by the sealing gasket, thus increasing the strength of the seal. This additional sealing area also increases the distance that electrolyte must travel to creep out of the cell and so forms a more effective barrier to electrolyte leakage. Because the crimping forces are directed normal to the swaging forces, less pressure can be concentrated at the interface between the sealing gasket and the upper edge of the perimeter of the cell cover, which reduces the likelihood of gasket cutthrough. Also, the nonuniform sidewall reduces the volume of gasket material that is squeezed between the bent over portion of the container sidewall and the cell cover so that gasket extrusion, which may interfere with terminal clearance, is effectively eliminated, and since the container sidewall is preferably bent substantially parallel to the container base, there is less probability that the container sidewall will protrude above the cell cover to prevent proper seating of the cell in the device.

The optimum configuration of the gasket sidewall as formed is dependent on the distance between the upper surface of the cell cover flange and the inner surface of the crimped segment of the container sidewall and the resiliency and cold flow characteristics of the gasket. Generally, for cells of about 0.063 inch (0.160 cm) and less in height, the thickness of a nylon gasket sidewall just above the flange is from between about 0.010 inch (0.025 cm) and about 0.018 inch (0.046 cm), and the thickness of the sidewall at its top is from between about 0.006 inch (0.015 cm) and about 0.014 inch (0.036 cm).

The nonuniform thickness of the gasket sidewall may begin at the base of the sidewall immediately above the gasket flange, may begin a distance above the flange approximately equal to the thickness of the cell cover flange, or may begin at any point there between. Furthermore, the nonuniform thickness of the gasket sidewall may be achieved with a linear or curved taper, or with incremental step changes, or with a combination thereof.

The sealing gasket comprises a material selected with consideration given to its stability in the presence of electrolyte, its resiliency, and its resistance to cold flow. Suitable polymeric materials are selected from the group consisting of nylon, polytetrafluoroethylene, fluorinated ethylene-propylene, ethylene copolymer with fluorinated ethylene-propylene, chlorotrifluoroethylene, perfluoro-alkoxy polymer, polyvinyls, polyethylene, polypropylene, polystyrene and the like. Other suitable materials would be recognizable by one skilled in the art. Additional precautions, well-known in the art, can be used in conjunction with the gasket of this invention to provide a more effective seal, such as coating the gasket sidewall surfaces with an adhesive agent such as a fatty polyamide resin.

The sealing gasket of this invention is amenable to production techniques such as injection molding. The configuration of the surfaces of the gasket sidewall is well suited for ease of removal from dies, punches and the like.

The sealing gasket of this invention is well-suited for assembly into miniature cells commonly known as button cells. Typically, a miniature cell is assembled by inserting a cathode material and a separator into a cell container. The sealing gasket is then seated in the container or placed in the container prior to the insertion of the cathode. Next, a cell cover, filled with anode material and electrolyte, is mated to the bottom portion of the cell assembly. Alternatively, the sealing gasket may be joined to the cell cover before coupling with the cathode portion of the cell. The flanged edge of the cell cover rests upon the inwardly extended flange at the base of the sealing gasket. Using a vertical taper on the inner surface of the gasket sidewall facilitates receiving and centering the cell cover within the cell assembly. The cell is then sealed by radially compressing the gasket between the cell cover and the container sidewall and by crimping the uppermost portion of the container sidewall so that it is bent substantially parallel to the container base and compresses the gasket material that is above and below the cell cover flange. Crimping the container sidewall substantially parallel to the base of the container produces what is commonly known as a small radius crimp. The radius referred to is the radius of the outer surface of the cell container sidewall at the point where it is bent. A small radius crimp is achieved with a crimping tool wherein the forming contour is essentially a right angle. Due to machinery limitations, there is provided a very small radius in the tool. During the crimping procedure, the cell container does not conform exactly to a right angle, the container having a radius as measured on the outer surface of the sidewall at the point of crimping of from about 0.005 inch (0.013 cm) to about 0.010 inch (0.025 cm).

The nonuniform gasket of this invention, coupled with small radius crimping, provides an effective seal between the cell container and cell cover of an electrochemical cell by increasing the sealing surface area, and also reduces gasket cutthrough, gasket extrusion, and sidewall protrusion; hence assuring a cell with sufficient terminal clearance for use in miniature electronic devices.

BRIEF DESCRIPTION OF DRAWINGS

The invention will become more apparent when considered together with the following drawings which are set forth as being merely illustrative of the invention and are not intended, in any manner, to be limitative thereof and wherein.

DETAILED DESCRIPTION OF DRAWINGS

Figure 1:
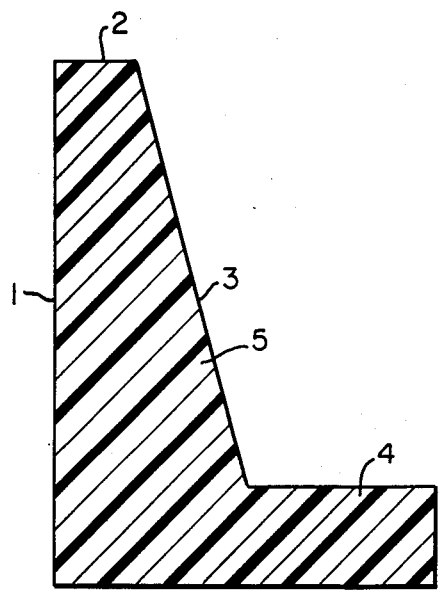
FIGS. 1, 2 and 3 are cross sectional views of the left side of gasket constructions in accordance with this invention.

Referring to FIG. 1, there is shown a cross sectional view of one embodiment of an annular sealing gasket of this invention. The cross-sectional area of the gasket comprises a sidewall 5 having an upright outer surface 1, a top surface 2 and a linearly tapered inner surface 3, and an inwardly extending flange 4 at the base of the sidewall which is adapted for supporting an anode cover flange. The linearly tapered inner sidewall surface 3 extends from immediately above the flange 4 to the top surface 2.

The annular sealing gasket, as shown in FIG. 1, has an uniform cross-section such that the upright outer surface 1 is substantially upright and the inner surface 3 is linearly tapered. The linear taper of inner surface 3 is oriented such that the bottom width of the side wall 5 is larger than the top width of the side wall 5. With such an orientation the inner surface 3 is like a hypotenuse.

Figure 2:
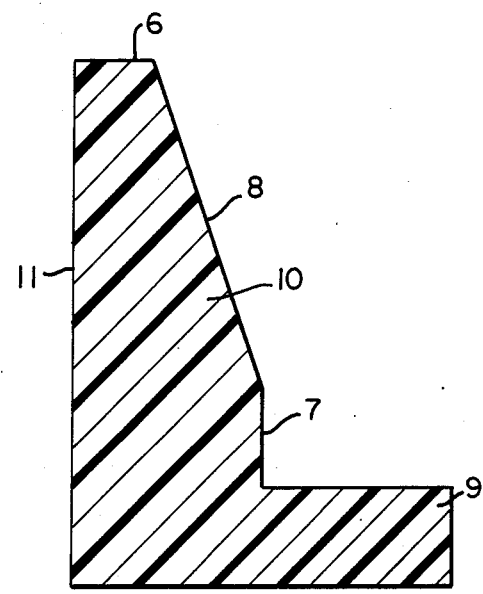

FIG. 2 shows an alternative embodiment of the gasket of this invention, which gasket comprises a sidewall 10 having an upright outer surface 11, a top surface 6 and an inner surface having an upright portion 7 and a linearly tapered portion 8, and an inwardly extending flange at the base of the sidewall 9. The upright portion of the inner surface of the gasket sidewall extends upwards from the point where said portion meets the gasket flange for a distance approximately equal to the thickness of a cell cover flange. The linearly tapered portion of the inner surface of the gasket sidewall extends above upright portion 7 and contacts top surface 6.

The sealing gasket which is annular, as shown in FIG. 2, has a substantially uniform cross-section. The outer surface 11 is substantially upright while the inner portion 8 is linearly tapered. The linear taper for the inner portion 8 commences at the intersection of the upright portion 7 and the inner portion 8. The linear taper for the inner portion 8 is oriented in such a manner such that the bottom width of the side wall 10 is larger than the top width of the side wall 10.

Figure 3:
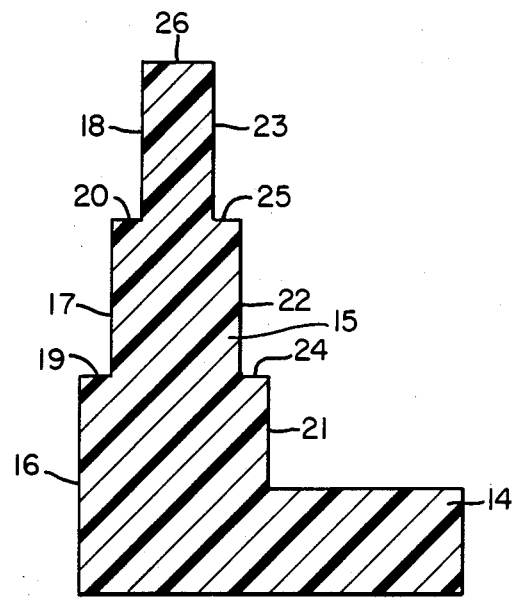

Referring to FIG. 3, there is shown a third embodiment of the gasket of this invention. In this embodiment the thickness of the gasket sidewall 15 above the flange 14 is upwardly reduced in incremental steps. The outer surface of the gasket sidewall comprises upright segments 16, 17 and 18 and horizontal segments 19 and 20 which separate adjoining upright segments so as to incrementally dispose each upper upright segment nearer to the inner surface. Similarly the inner surface of the gasket sidewall comprises upright segments 21, 22 and 23 which segments are separated by horizontal segments 24 and 25 and wherein the horizontal segments are disposed so as to position each upper upright segment nearer to the outer surface. The uppermost segments of the outer and inner sidewall surfaces are separated by top surface 26. Although not shown, for most applications only the inner sidewall surface has incremental step changes.

Figure 4:
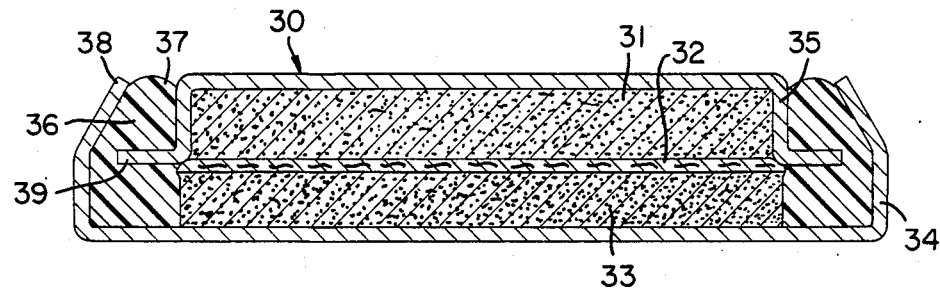
FIG. 4 is a sectional side elevation view taken through an assembled button cell of the prior art construction.

FIG. 4 illustrates a sectional elevation of an assembled prior art miniature cell designated by reference number 30. This cell comprises an anode material 31, a separator 32 and a cathode material 33 housed within a structure comprising a cell container 34 having a base and sidewall and a cell cover 35 having a peripheral flange 39. As shown, seal gasket 36 is disposed between the sidewall of said cell container 34 and said cell cover 35 and has the highest compression between the container sidewall and the cell cover flange 39. Terminal clearance may in some cases be obstructed by the extruded portion of the seal gasket 37, or the uppermost portion of the container sidewall 38.

Figure 5:
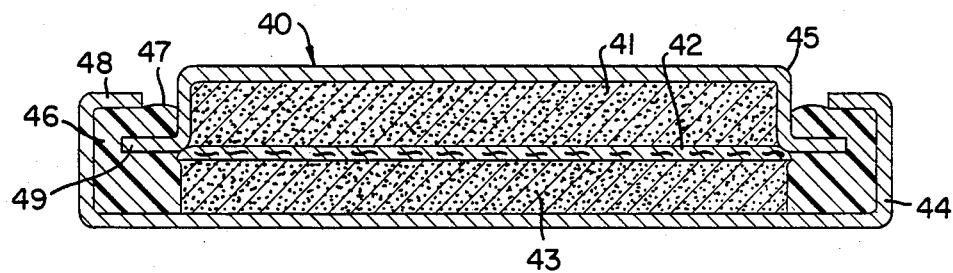
FIG. 5 is a sectional side elevation view taken through an assembled button cell in accordance with this invention where the sealing gasket has a nonuniform sidewall thickness and the upper portion of the cell container sidewall is bent substantially parallel to the base of the container.

A sectional elevation of a cell assembled in accordance with this invention is shown in FIG. 5 and identified by reference number 40. This cell features an anode material 41, a separator 42, and a cathode material 43 housed in a cell container 44 having a base and sidewall and covered with a cell cover 45 having a peripheral flange 49. A gasket of this invention 46 is radially compressed between the container sidewall and the cell cover flange 49. The uppermost portion of the container sidewall 48 is crimped substantially parallel to the container base, applying sealing force on those portions of the sealing gasket which embrace the cell cover flange from above and below. The gasket of this invention has less material above the cell cover flange which reduces gasket extrusion. As can be seen in the drawing, cell cover 45 clears the uppermost portion of container sidewall 48 and exposed gasket material 47 to provide ample terminal clearance.

The structure of the sealing gasket of this invention is ideally suited for round cells as discussed in the example. The reason is that the tapered inner surface 3 will accommodate the perpendicularly expanding portion of the gasket, and upon crimping there will be little or no extrusion of the exposed gasket material 47 as shown in FIG. 5.

A sealing gasket in accordance with this invention will provide an effective barrier to electrolyte leakage and assure terminal clearance for use in, and electronic contact within, snug-fitting miniature cavities of electronic devices.

EXAMPLE

An initial lot of button cells was manufactured wherein each cell had an overall height of about 0.040 inch (0.102 cm) and, by utilizing a sealing gasket of this invention, a height at the sealing edge of the cell of about 0.038 inch (0.097 cm).

A sealing gasket having an about 0.460 inch (1.168 cm) outer diameter and about an 0.311 inch (0.790 cm) inner diameter was inserted into an about 0.472 inch (1.199 cm) outer diameter cell container which had an about 0.055 inch (0.140 cm) high sidewall and a base and sidewall thickness of about 0.006 inch (0.15 cm). The overall height of the gasket sidewall was about 0.032 inch (0.081 cm). The gasket sidewall had a substantially upright outer surface and a linearly tapered inner surface such that the thickness of the sidewall immediately above the gasket flange was about 0.015 inch (0.038 cm) and the thickness of the sidewall at its top was about 0.0125 inch (0.0318 cm).

The cell container was assembled with a cathode material, covered with a separator layer, an electrolyte and an anode material. A flanged cell cover was seated over the anode material, which flange rested on the seal gasket flange.

The cell assembly was swaged and crimped during which the uppermost portions of the sealing gasket and container sidewall were bent substantially parallel to the base of the cell container. The overall height of the cell was about 0.040 inch (0.102 cm). The overall height of the sealed periphery of the cell was about 0.038 inch (0.097 cm).

Although inconsistent and improper anode amalgamation and ion migration around the separator adversely affected the cells, such cells had shelf lives of approximately four weeks at 71° C. and two years at 21° C., and at nine months only about eight percent exhibited some light salting which would indicate electrolyte creepage out of the cell.

It is to be understood that modifications and changes to the preferred embodiment of the invention herein shown and described can be made without departing from the spirit and scope of the invention.

I claim:

1. In a sealed miniature cell comprising a container having a base, upright sidewall and an open end; an electrolyte, a cathode, an anode and a separator being disposed within said container and wherein said separator electrically insulates said cathode from said anode; a cell cover disposed and secured at the open end of said container with a sealing gasket between said container and said cover; the improvement wherein the cross-sectional area of the gasket in the plane containing the center axis of said sealing gasket and perpendicular to the base of said sealing gasket has a uniform cross-section and wherein said sealing gasket comprises a substantially upright annular sidewall having an inner surface, an outer surface, a top surface and an inwardly disposed flange at the base of said sidewall, said sidewall having a non-uniform thickness wherein said inner surface is linearly tapered above the intersection of said inner surface and said flange such that the bottom width of said sidewall is larger than the top width of said sidewall; an upper portion of said sealing gasket and container sidewall being crimped such that said upper portion of said sealing gasket is compressed between the peripheral edge of said cell cover and said upper portion of said container sidewall such that the uppermost bent over portion of said container sidewall is substantially parallel to said container base, and said uppermost bent over portion being disposed below the top surface of said cell cover.

2. The sealed miniature cell in accordance with claim 1 wherein the thickness of said nonuniform sidewall begins to vary at a distance above the inwardly disposed flange of said gasket approximately equal to the thickness of the cell cover.

3. The sealed miniature cell in accordance with claim 1 wherein the average thickness of the sealing gasket sidewall at its top quarter is from about 25 to about 85 percent of the average thickness of the sealing gasket sidewall at the gasket sidewall section beginning immediately above the flange.

4. The sealed miniature cell in accordance with claim 1 wherein said sealing gasket is made from a polymeric material selected from the group consisting of nylon, polytetrafluoroethylene, fluorinated ethylene-propylene, ethylene copolymer with fluorinated ethylene-propylene, chlorotrifluoroethylene, perfluoro-alkoxy polymer, polyvinyls, polyethylene, polypropylene, and polystyrene.

5. The sealed miniature cell in accordance with claim 1 wherein the said sealing gasket is coated with a fatty polyamide resin.

* * * * *